US006012497A

United States Patent [19]

Stottmann

[11] Patent Number: 6,012,497

[45] Date of Patent: Jan. 11, 2000

[54] MODULAR PANEL FOR THE FABRICATION OF DOVETAIL JOINTS

[76] Inventor: Richard L. Stottmann, 5204 Avish La., Harrods Creek, Ky. 40027

[21] Appl. No.: 09/211,061

[22] Filed: Dec. 14, 1998

Related U.S. Application Data

[60] Provisional application No. 60/069,467, Dec. 15, 1997, and provisional application No. 60/071,239, Jan. 12, 1998.

[51] Int. Cl.[7] .............................. B27M 3/00; B27C 1/00; B27C 5/00; B23C 9/00; B27F 1/14

[52] U.S. Cl. .............................. 144/372; 33/562; 33/563; 144/144.1; 144/144.51; 409/130; 409/132

[58] Field of Search .............................. 33/562, 563, 564; 409/125, 130, 131, 132, 182; 144/85, 87, 78, 137, 136.95, 144.1, 144.51, 154.5, 347, 371, 372, 329

[56] References Cited

U.S. PATENT DOCUMENTS

| | | |
|---|---|---|
| 4,014,090 | 3/1977 | Rusk et al. . |
| 4,074,736 | 2/1978 | Wolff . |
| 4,168,730 | 9/1979 | Keller . |
| 4,405,004 | 9/1983 | Dicke . |
| 4,428,408 | 1/1984 | Grisley . |
| 4,630,657 | 12/1986 | Obraddvich . |
| 4,809,755 | 3/1989 | Pontikas . |
| 4,837,939 | 6/1989 | Pullen . |
| 5,139,062 | 8/1992 | Keller . |
| 5,143,132 | 9/1992 | Keller . |
| 5,161,592 | 11/1992 | Rasmussen . |
| 5,199,477 | 4/1993 | Keller . |
| 5,285,580 | 2/1994 | Christensen . |
| 5,285,822 | 2/1994 | Gibson . |
| 5,345,986 | 9/1994 | Kieffer . |
| 5,692,861 | 12/1997 | Stottman . |
| 5,832,977 | 11/1998 | Hampton ............................ 144/144.51 |

*Primary Examiner*—W. Donald Bray
*Attorney, Agent, or Firm*—Wheat, Smith & Beres, PLC; Vance A. Smith; David W. Nagle, Jr.

[57] ABSTRACT

A modular panel can used either as a pattern plate or a template to create a pattern plate in the fabrication of dovetail joints. This panel is a planar member having a generally rectangular shape, including a pair of sides, a left edge, and a right edge. The panel defines a first plurality of elongated openings positioned adjacent one of the sides of the panel, each of said openings extending between oppositely disposed first and second circular ends, said openings being used as a guide to cut the tails of a dovetail joint. The panel further defines a second plurality of openings positioned adjacent the other side of the panel. These openings are used as a guide to cut the pins of a dovetail joint. Additionally, the panel defines "half-openings" along its left and right edges. Thus, when two panels are placed side-by-side, the adjacent half-openings form the above described first and second elongated openings, thereby allowing a series of panels to be used to create dovetail joints of an indefinite length.

12 Claims, 6 Drawing Sheets

MODULAR PANEL FOR THE FABRICATION OF DOVETAIL JOINTS

This application claims priority from U.S. Provisional Application Ser. No. 60/069,467 filed on Dec. 15, 1997 and U.S. Provisional Application Ser. No. 60/071,239 filed on Jan. 12, 1998.

BACKGROUND OF THE INVENTION

The present invention relates to a modular panel that can be used either as a pattern plate used in the fabrication of dovetail joints, or as a template for creating such pattern plates.

The use of dovetail joints to fit parts of furniture together is an admirable and old woodworker art which is generally pleasing to the eye, particularly when the joints are created by hand with a nonuniform, classic appearance. Dovetails made with perfectly fitting joints are considered to be the product of highly skilled craftsmen. Those steeped in knowledge of the art carefully review the quality of the joints and grade the craftsman's woodworking abilities.

A dovetail joint has two different parts, or components, called tails and pins which fit together in a complimentary fashion to form the attractive looking joint. The most popular dovetail joints are the "half-blind" and the "through" dovetail joints. The half-blind joint can only be seen on one side of the two joined surfaces and is primarily used for flushed and lipped drawers. The through joint can be seen on both surfaces. Whether half-blind or through dovetail joints are being crafted, it is almost axiomatic that the more tails and pins required for a particular woodworking project, the more time-consuming the fabrication becomes. For those who make a living constructing furniture that typically incorporates dovetail joints, a compromise has to be struck between the number of pins seen in the joint and the expense of forming the joint. Also, when too few pins are used in joining a pair of wood members, the resulting joint may be structurally too weak. To reduce the amount of time required to produce dovetail joints, many craftsmen resort to using various types of commercially available "jigs." A "jig," for purposes of this description, may be defined as a device used to mechanically maintain the correct positional relationship between a piece of work and the tool. A multi-functional jig producing half-blind or through joints of variable spacing is available from Leigh Industries in Port Coquitlam, British Columbia, Canada. Similarly, Porter-Cable produces a jig, known as the "Omnijig," which is capable of producing various types of dovetail joints, including half-blind and through joints. The jigs, while providing admirable dovetail joints, are complicated to set up and use, and provide only joints of limited length.

Perhaps the easiest-to-use jig for the making of through dovetail joints is the Keller dovetail "template" system, available from Keller & Co., of Petaluma, Calif., which involves, in part, the use of a template. In the woodworking art, the terms "jig" and "template" are used interchangeably. However, to promote clarity in this description, a "template" is distinguished from the aforementioned definition of a "jig" by being defined as a gauge, pattern or mold, typically formed in a thin plate or board, used as a guide for a tool, such as a router, to replicate the pattern of the template in a piece of material secured or fixed to the template. Similarly, a "pattern plate," again for purposes of this description, is defined as a plate having a pattern serving as a guide for a router and the like to fabricate a configuration in a work piece. The Keller system employs the use of machined pattern plates as a guide for a router bit to directly fabricate the mating parts of a dovetail joint, namely, the pins and tails. The Keller system, described in detail in several patents, including U.S. Pat. Nos. 4,168,730; 5,139,062; and 5,199,477, is easy to use and can provide variable length dovetail joints with variable spacing. The Keller system, however, is cumbersome when used to make dovetail joints with variable spacing and often requires the purchase of a different jig. Moreover, the individual cutters and pattern plates comprising the system are expensive and must be replaced when accidentally damaged by a router bit during use or bent by accidentally dropping the plates. The home craftsman has limited ability to repurchase such pattern plates.

U.S. Pat. No. 5,692,861, issued to Stottmann, overcomes many of the problems encountered in the prior art, and is incorporated herein by reference. The Stottmann device is a single planar member having a pair of sides in which the member defines first and second pluralities of elongated openings. The first plurality of elongated openings is positioned adjacent one of the sides of the member, each of said elongated openings extending between oppositely disposed first and second circular ends. These openings further have opposing parallel sides spaced a predetermined distance apart. The first circular ends have diameters substantially equal to this distance, while the second circular ends have diameters larger than this distance.

The second plurality of openings in the Stottmann template is positioned adjacent the other side of the planar member. A first portion of the second openings has spaced opposing sides that are parallel, while a second portion of the second openings has opposing sides that converge toward one another and away from the first portion. The convergence of the sides of the second openings defines an angle substantially equal to the slope angle of the preselected dovetail cutter bit.

In using this template, the template is preferably first positioned over a rectangular form, comprised of inexpensive, but cuttable material. Starter holes are also drilled into the underlying form. A starter bit is passed through the enlarged diameter holes of selected openings of the plurality of first openings, and then through selected openings of the second portion of the plurality of second openings. A pattern cutter bit with a rotatable guide bearing of a diameter less than the diameter of the starter holes is inserted through the openings so that the cutter bit extends into the starter holes, and the rotatable bearing is rotatably engaged with the side of the openings. A plurality of pin openings and a plurality of dovetail openings are then cut in the form. The form, now a unitary pattern plate, is removed from the template and ready to use.

The described Stottmann device thus provides for the creation of a fixed-length pattern plate which is then used for fabricating the dovetails and pins. This is preferred because the template itself is subject to damage if it is used to directly cut the dovetails and pins, and replacement of the template can be costly.

It is therefore an object of the present invention to provide a pattern plate that allows for the creation of dovetail joints of unlimited length.

It is a further object of the present invention to provide an inexpensive device that can be used both directly as a pattern plate, eliminating the intermediate step of using a template to cut a pattern plate, or as a template.

These and other objects and advantages of the present invention will become apparent upon a reading of the following description and appended claims.

SUMMARY OF THE INVENTION

The present invention is a panel that can used either as a pattern plate or a template. This panel is preferably a planar member having a generally rectangular shape, including a pair of sides, a left edge, and a right edge. The panel defines first and second pluralities of elongated openings. The first plurality of elongated openings is positioned adjacent one of the sides of the panel, each of said openings extending between oppositely disposed first and second circular ends. Each opening further has opposing parallel sides spaced a predetermined distance apart. The first circular end has a diameter substantially equal to this distance, while the second circular end has a diameter greater than this distance. Additionally, the panel defines "half-openings" along its left and right edges. Thus, when two panels are placed side-by-side, the adjacent half-openings form the above described first elongated opening.

The second plurality of openings is positioned adjacent the other side of the panel. A first portion of the second openings has spaced opposing sides that are parallel, while a second portion has opposing sides that converge toward one another. The convergence of the sides of the second openings defines an angle substantially equal to the angle of the preselected dovetail cutter bit. Again, the panel defines "half-openings" along its left and right edges. Thus, when two panels are placed side-by-side, the adjacent half-openings form the above described second elongated opening.

With the half-openings along either edge of the panel, a series of panels may be placed side-by-side to fabricate dovetails of an unlimited length. Because of the modularity of these panels, if an individual panel is damaged, it may be replaced without affecting the adjacent panels.

Additionally, rather than having a unitary piece defining both the first and second plurality of openings, two separate panel pieces may be used for separately making the pins and tails of a dovetail joint, the first panel defining the first plurality of openings and the second panel defining the corresponding second plurality of openings.

DESCRIPTION OF THE PREFERRED EMBODIMENTS

The art of preparing dovetail joints is replete with language and specific definitions. To ensure clarity, it is important to define some of this language as is used in this description. A "dovetail joint" is a joint in which two ends of members, typically made of wood, are meshed together in a complimentary joint. In the machining of "through" dovetail joints, wood is carefully and precisely removed from an end of each wooden member to form "dovetails or tails" and "pins" which extend across the entire thickness of each member. The spacing where the wood is removed between the tails and pins are "sockets" into which the tails and pins fit snugly in a well made dovetail joint. To machine the sockets, the craftsman selects a dovetail bit of a particular diameter, slope angle, adjustable cutting height, and shank size. The diameter of the bit determines the minimum width of the socket, the cutting height determines the maximum socket depth, and the slope angle determines the slope angle of the dovetail joint. Typical bits come in diameters between about ⅛" to 1¼", and angles vary from less than 5 degrees to 14 degrees, although typical angles used are in the range of five to 10 degrees. As stated above, many craftsmen prefer using jigs and associated pattern plates when constructing dovetail joints as a means to save time. When a pattern plate is employed, the shanks of the bits used to cut the wood come equipped with a rotatable bearing that engages the sides of the pattern plate to guide the cutting action of the bit blade. Alternatively, guide bushings for the router may be used.

The present invention does not pertain to the technique of making dovetail joints, but rather is drawn to an inexpensive modular panel that is constructed so that a series of such panels may be used to create dovetail pattern plates of an indefinite length. Furthermore, this panel can be used directly as a pattern plate, thereby eliminating the intermediate step of using a template to fabricate a pattern plate. To promote a clearer understanding of the present invention, it is appropriate to initially discuss how pattern plates generally are used to fabricate the pins and tails of a dovetail joint. For a more detailed discussion of the use of pattern plates to fabricate the pins and tails of a dovetail joint, reference can be made to a number of readily available and know publications on the subject, including U.S. Pat. Nos. 4,168,730; 5,139,062; 5,199,477; and 5,692,861, as mentioned above.

Preparation of a Dovetail Joint Using Pattern Plates

Figure 1:
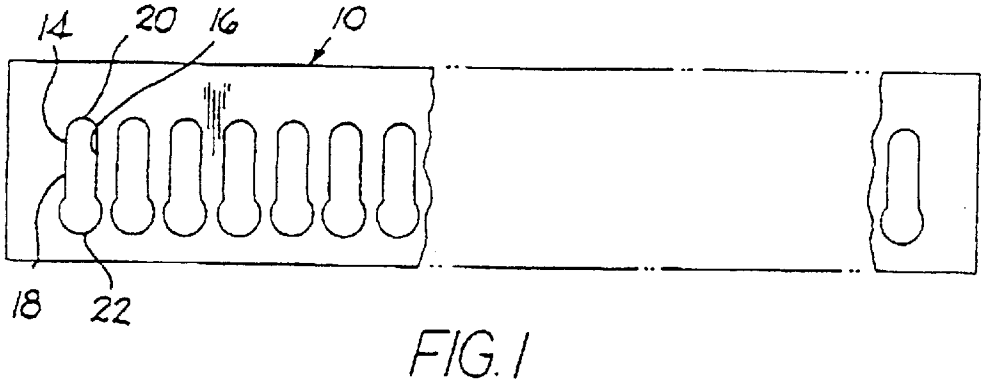
FIG. 1 is a top plan view of a tail pattern plate made in accordance with the present invention.
Figure 2:
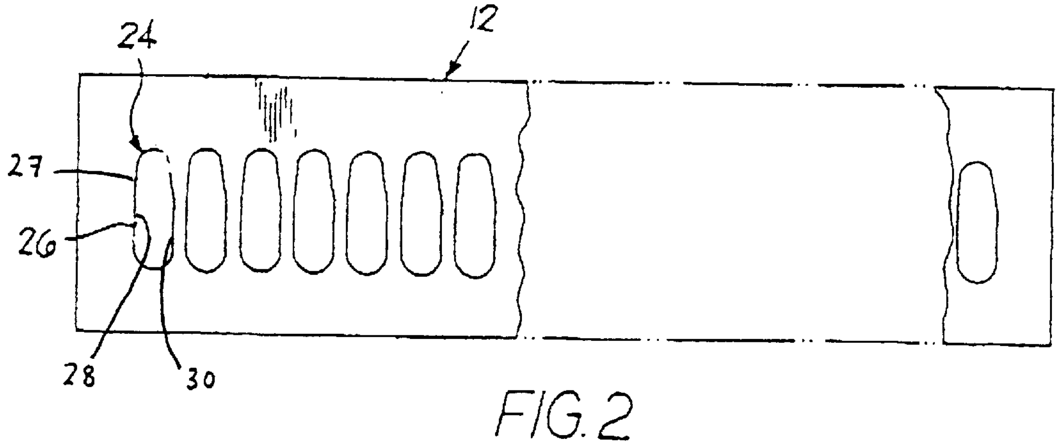
FIG. 2 is a top plan view of a pin pattern plate made in accordance with the present invention.

FIGS. 1 and 2 depict, respectively, a separated "tail" pattern plate 10 and a separated "pin" pattern plate 12, each made using the panel of the present invention as a template, as will be described further below. As shown in FIG. 1, the tail pattern plate 10 defines a multiplicity of elongated tail openings 14 that extend along the width of the pattern plate. Each opening 14 has parallel spaced sides 16, 18 extending between first and second circularly-shaped ends 20, 22. The diameter of the first end 20 is equal to the distance between the parallel sides 16, 18 while the second circular end 22 has a diameter greater than the diameter of a dovetail bit associated with the pattern plate 10.

Figure 12:
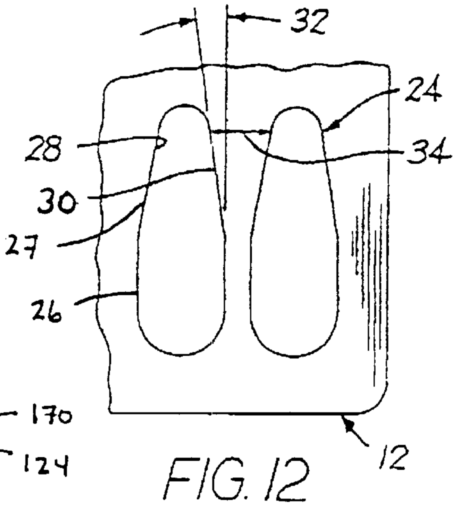
FIG. 12 is an expanded top view of two adjacent openings of the pin pattern plate of FIG. 2.

Referring now to FIG. 2, the separated pin pattern plate 12 defines a second group of elongated openings 24 called pin openings that extend along the width of the pattern plate 12. As best illustrated in the expanded view of FIG. 12, each of the pin openings 24 has a portion 26 in which the spaced opposing sides 28, 30 are substantially parallel and a portion 27 in which the sides 28, 30 are converging toward each other. The angle of convergence 32 of the sides may be defined as the angle formed between the converging sides and parallel sides, as indicated by the dashed extensions of those sides in FIG. 12. As will become clearer, this angle of convergence 32 must be equal to the dovetail bit angle used in forming the pin sockets between the tails. Moreover, the distance 34, the maximum width of a pin formed when the wood material between adjacent pin openings is removed, should be substantially equal to the diameter of the dovetail bit used.

To illustrate how the pins and tails of the dovetail joint are created, reference is made to FIGS. 3, 6, 8 and 10 to illustrate how the pin sockets are cut, and to FIGS. 4, 5, 7 and 9 to illustrate how the corresponding tail sockets are cut.

Figure 3:
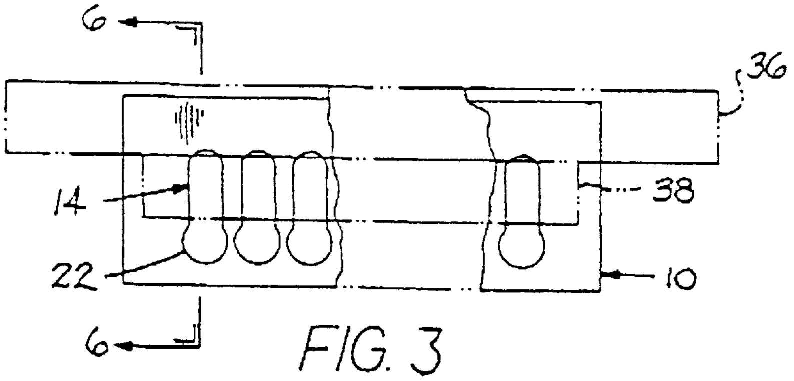
FIG. 3 is a top view of the tail pattern plate of FIG. 1 mounted for use.
Figure 6:
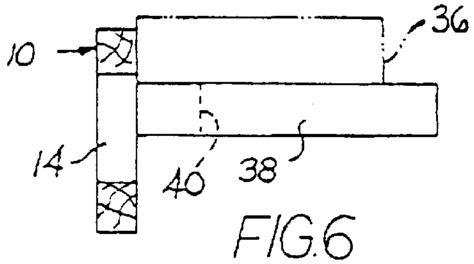
FIG. 6 is a sectional view of the tail pattern plate taken along lines 5—5 of FIG. 3.
Figure 8:
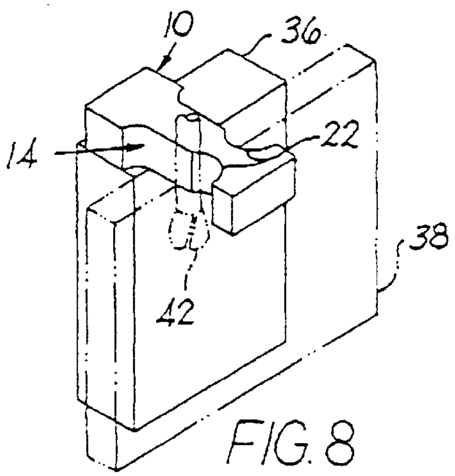
FIG. 8 is a perspective view illustrating the cutting of a tail board of a dovetail joint using the pin pattern plate of FIG. 1.

In creating a dovetail joint, the pin sockets are fabricated first. It is important to recall that the pin sockets are the openings into which the pins will fit. To prepare the pin sockets, as illustrated in FIGS. 3, 6 and 8, a tail board 38 (into which the pin sockets are cut) is clamped to a backing member 36. The surface of this tail board 38 that will be visible when the joint is completed, the "appearance" surface, abuts the backing member 36. Once the backing member 36 and tail board 38 are secured, the tail pattern plate 10 is clamped or otherwise secured to the clamped backing member 36 and tail board 38 such that the second circular ends 22 of the tail openings 14 are not over the tail board 38. The parallel side walls of the openings 14 defined by the pattern plate 10, however, should extend beyond the thickness of the tail board 38 on both sides. The thickness of the board to be used as a pin board is etched on the tail board 38, as shown by a dashed line 40 in FIG. 6.

Figure 10:
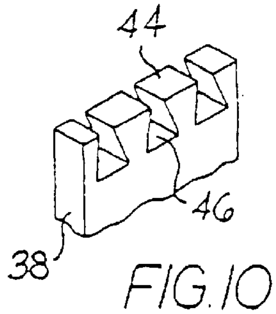
FIG. 10 is a perspective view of a tail board of a dovetail joint created using the pattern plate of FIG. 1.
Figure 8A:
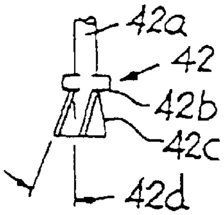
FIG. 8*a* is a side view of a preferred dovetail bit used in the cutting of the tail board of the dovetail joint.

Next, an appropriate dovetail bit 42 is selected. As shown in FIG. 8*a*, a typical dovetail bit has a shank 42*a* for clamping to a router, a bearing guide member 42*b*, and a flared blade 42*c*. The flare or slope angle 42*d* of the blade 42*c* determines the angle of the resulting dovetail joint. Thus, it is essential that the dovetail slope angle 42*d* be substantially equal to the angle of convergence 32, as defined above. To cut the pin sockets, the shank 42*a* of the dovetail bit 42 is secured to the collect of a router (not shown) and then inserted through the second circular end 22, as shown in FIG. 8. The relative height of the shank 42*a* is adjusted to cut to the depth indicated by the dashed line 40 in FIG. 6. Using well-known techniques and observing the appropriate safety precautions, the craftsman then starts the router and uses the dovetail bit 42 to cut away the wood in the tail board, forming the pin sockets as the rotatable bearing 42*b* follows the guide provided by the sides of the openings 14 in the tail pattern plate 10. As illustrated in FIG. 10, the result is the formation of the dovetails 44 and pin sockets 46 along the edge of the tail board 38.

Figure 4:
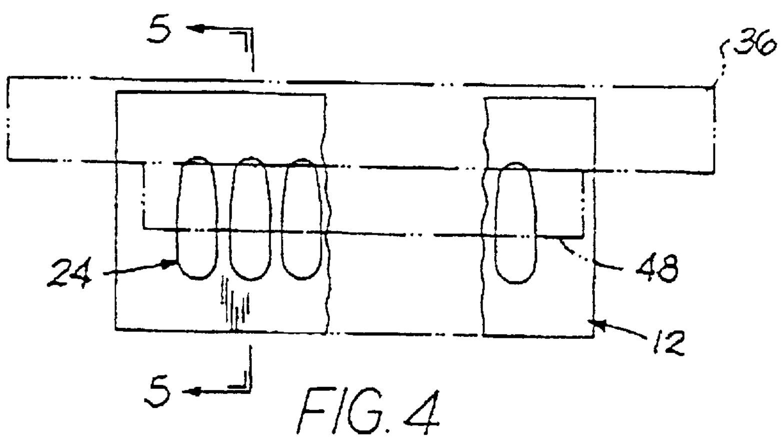
FIG. 4 is a top view of the pin pattern plate of FIG. 2 mounted for use.
Figure 5:
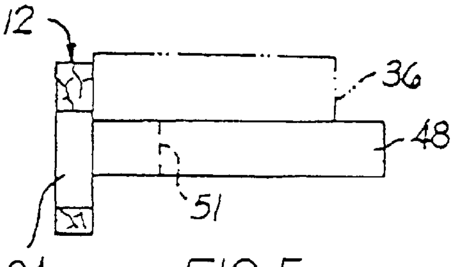
FIG. 5 is a sectional view of the pin pattern plate taken along lines 5—5 of FIG. 4.
Figure 7:
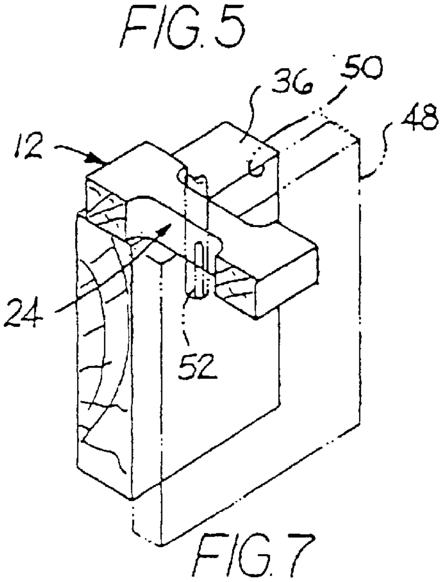
FIG. 7 is a perspective view illustrating the cutting of a pin portion of a dovetail joint using the pin pattern plate of FIG. 2.
Figure 9:
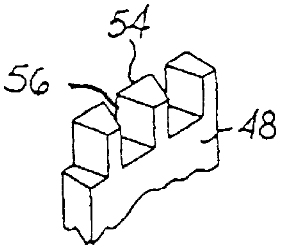
FIG. 9 is a perspective view of a pin board of a dovetail joint created using the pattern plate of FIG. 2.
Figure 7A:
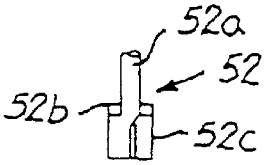
FIG. 7*a* is a side view of a preferred bit used in the cutting of the pin board of the dovetail joint.

The finished tail board 38 is then used to assist in the fabrication of the pin board 48, as illustrated in FIGS. 4, 5 and 7. The end of the tail board 38 is aligned with the end of the pin board and the side profiles of preferably two or more dovetails 44 are traced with a sharp edge onto the end of the pin board 48, as indicated by the single profile line 50 in FIG. 7. The backing member 36 is then clamped or otherwise secured to the pin board 48 with the appearance surface of the pin board 48 abutting the backing member 36. Then, the openings 24 in the pin pattern plate 12 are aligned with the traced profile line 50 on the pin board 48 so that the diverging sides 28, 30 overlap the width of the pin board 48. The thickness of the tail board 38 is then penciled onto the pin board 48, as indicated by the dashed line 51 in FIG. 5. A pin bit 52, such as that shown in FIG. 7*a*, is then selected. These pin bits have a shank 52*a* adapted to be secured in the collect of a router (not shown), a bearing guide member 52*b*, and a straight cutting blade 52*c*. The relative height of the pin bit 52 is adjusted to cut to the depth indicated by the dashed line 51 in FIG. 5. Again, using well-known techniques and observing the appropriate safety precautions, the craftsman then starts the router and uses the pin bit 52 to cut away the wood in the tail board, forming the tail sockets as the rotatable bearing 52*b* follows the guide provided by the converging sides of the openings 24 in the pin pattern plate 12. As illustrated in FIG. 9, the result is the formation of the pins 54 and tail sockets 56 along the edge of the pin board 48.

Figure 11:
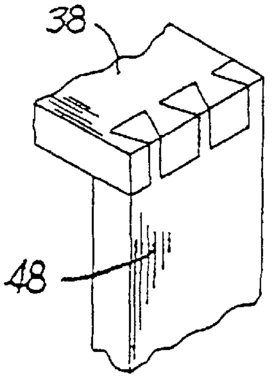
FIG. 11 is a perspective view of a dovetail joint formed by the mating of the pin and dovetail boards of FIGS. 9 and 10.

As illustrated in FIG. 11, the fabricated ends of the tail board 38 and pin board 48 may then be mated to create the dovetail joint. FIG. 11 further illustrates the importance of ensuring that the angle of convergence 32 is equal to the slope angle of the dovetail bit 42.

Use of the Modular Panel as a Template

Figure 13:
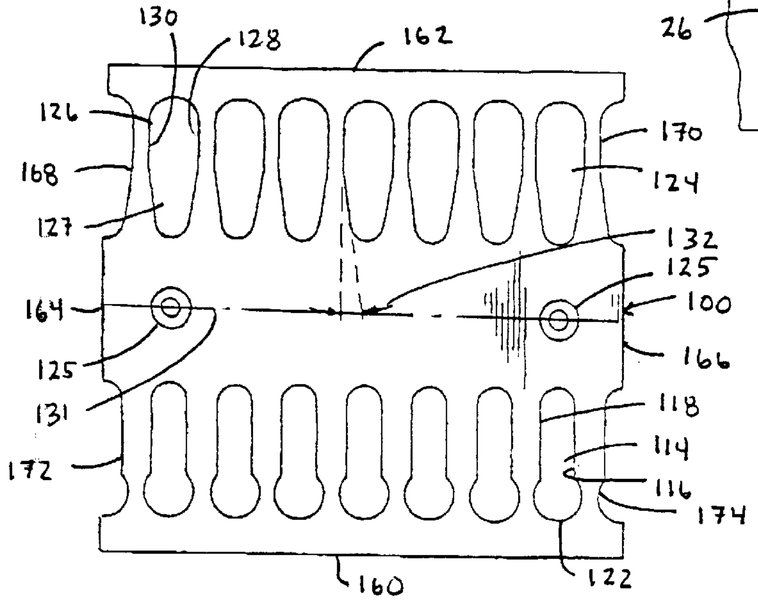
FIG. 13 is a top plan view of a panel made in accordance with the present invention that can be used either as a pattern plate as shown in FIGS. 1–12, or as a template to create pattern plates.
Figure 14:
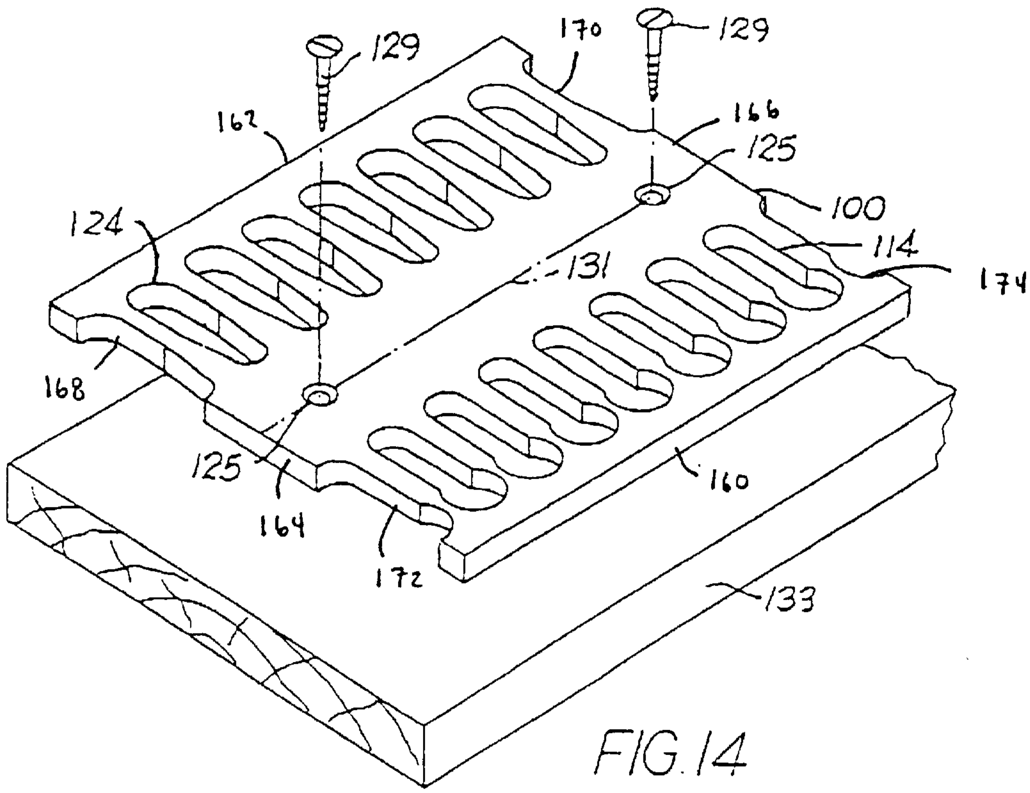
FIG. 14 is a perspective view of the panel of FIG. 13 being mounted to cuttable material (a "form") so that it may be used as a template to fabricate pin and tail pattern plates.

FIGS. 13 and 14 depict a preferred panel 100 made in accordance with the present invention wherein the panel 100 is used as a template to make pattern plates that are used in the fabrication of dovetail joints, as described above and shown in FIGS. 1–12.

Because the template closely resembles the pattern plates 10, 12 described above, corresponding character numbers in the 100's are used, where possible, to identify the similar features of the preferred panel 100.

The preferred panel 100 is a unitary planar member, preferably constructed by the injection molding of a durable thermoplastic, such as polypropylene. However, other more expensive materials, such as aluminum or other metals, could also be used without departing from the spirit and scope of the present invention. The panel has two sides 160, 162, a left edge 164, and a right edge 166. A first plurality of elongated openings 114 align one side 160 of the panel 100, and a second plurality of elongated openings 124 align the opposite side 162 of the panel 100. The panel 100 further defines a pair of counter-bored openings 125 adapted to receive flat-headed wood screws 129 (shown in FIG. 14). These openings 125 are positioned essentially in the same plane as the first and second plurality of openings 114, 124. These openings 125 are preferably located along a center line 131 of the panel 100 bisecting the region defining the first plurality of openings 114 from the region defining the second plurality of openings 124. The counter-bored openings 125 allow the pattern plate to be secured to the working material. As illustrated in FIG. 14, the panel 100 may be easily mounted and fixed by screws 129 to a form of cuttable material such as, for example, a wooden board 133 from which the dovetail pattern plates 10, 12 are to be fabricated. Since the panel 100 is used as a template to create pattern plates, the openings 114, 124 defined by the panel have the same respective geometries as the openings 14, 24 in the pattern plates 10, 12 as described above. That is, the tail openings 114 have parallel opposing sides 116, 118 and an enlarged circular end 122. Similarly, the pin openings 124 each have a first portion 126 in which the spaced opposing sides 128, 130 are substantially parallel and a second portion 127 in which the sides 128, 130 coverage toward one another.

Figure 15:
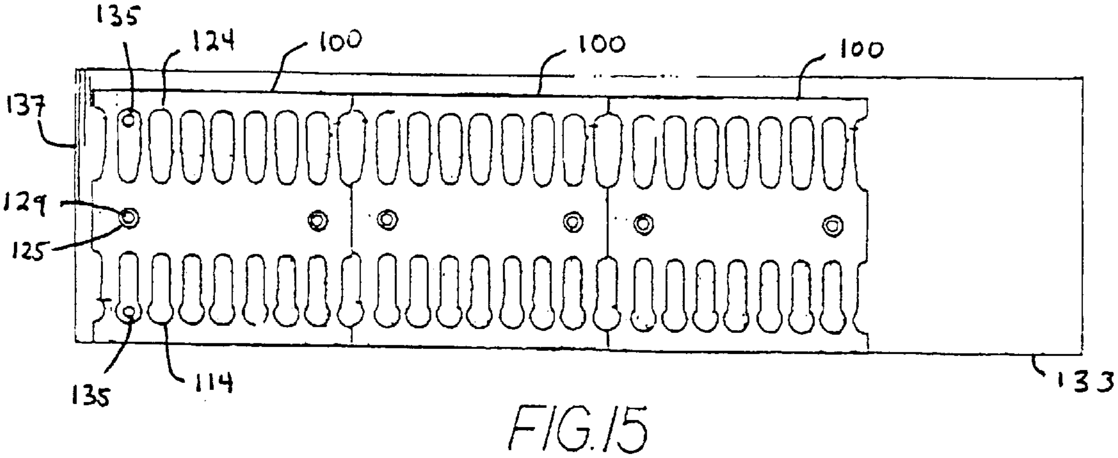
FIG. 15 is a top plan view of a series of panels made in accordance with the present invention being used as templates to fabricate pin and tail pattern plates of an indefinite length.
Figure 16:
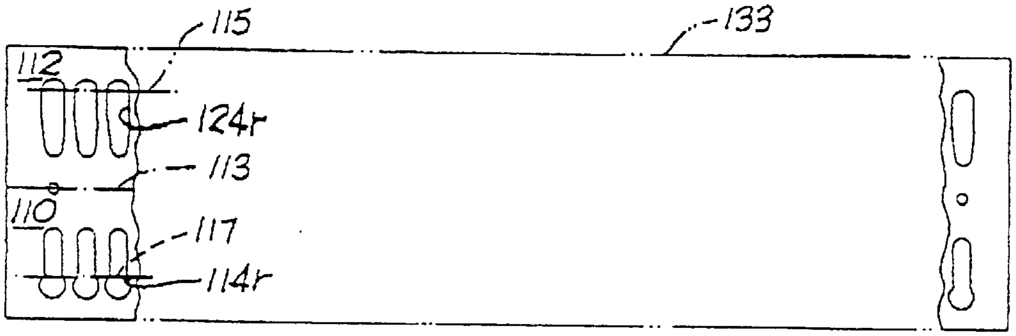
FIG. 16 is a top plan view of a pattern plate of indefinite length.

As an additional improvement over the prior art, and specifically U.S. Pat. No. 5,692,861 issued to Stottmann, along the left and right edges 164, 166 of the modular panel of the present invention are left and right pin half-openings 168, 170 and left and right tail half-openings 172, 174. The pin half-openings 168, 170 result when the above described pin opening 124 is bisected along its long axis. Similarly, the tail half-openings 172, 174 are the result of the above described tail opening 114 being bisected along its long axis. Because of these half-openings 168, 170, 172, 174, a series of panels 100 can be laid side-by-side as templates, as shown in FIG. 15, to fabricate a pattern plate of indefinite length, as shown in FIG. 16. With this modular construction, damage to an individual panel 100 will not require replacement of the entire working fixture; only the individual damaged panel 100 need be replaced.

Although the unitary member described above is often preferred, two separate panel pieces could be used to accomplish the same result, the first panel piece defining the first plurality of openings 114, and the second panel piece defining the second plurality of openings 124. These separate panel pieces may be formed by dividing the preferred panel 100 shown in FIGS. 13 and 14 along its center line 131.

Fabricating Dovetail and Pin Pattern Plates

The following description is directed toward a preferred method of using the panel 100 described above as a template in the fabrication of dovetail pattern plates requiring a ½" diameter dovetail bit with a slope angle of 8° and a 13⁄16" cutter length. Dovetail bits having other slope angles could also be used provided that the pin openings 124 of the selected panel 100 have a corresponding angle of convergence 32. For purposes of this description of the method of using the panel 100 of the present invention as a template, the respective pin and tail openings 114, 124 are spaced at a center-to-center distance of one inch.

Referring now to FIG. 15, one or more panels 100 is aligned flush with the bottom edge of the pattern plate form board 133 and secured to the board 133 by wood screws 129 or similar fasteners. The leftmost panel 100 is approximately two inches away from the left edge 137 of the board 133. This step of aligning and securing the panel 100 to the board 133 should not be construed as limiting as it is only for the convenience of the craftsman. Other alignment and securing techniques could be employed without departing from the spirit and scope of the present invention.

The thickness of the board 133 is preferably between about ⅛" and 1" although constraints with respect to material thickness are largely dependent on the router bit constraints. In the widest part of each opening 114, 124, a ⅝" starter hole 135 is drilled through the board 133, as indicated in FIG. 15. Upon completion of drilling of the starter holes 135 in each of the two groups of openings 114, 124, a ½" pattern bit is inserted into the starter holes 135. Using the sides of the openings 114, 124 as guides, the craftsman removes the material in the board 133, thereby replicating the openings 114, 124 in the board 133. FIG. 16 depicts the openings in the board 133, referring to these openings as 114*r* and 124*r*, with the "r" denoting that each opening is replicated from a template. Cutting away the board material to replicate the panel's pin and tail openings 114, 124 in the board often may be accomplished by a single pass of a router. However, it often desirable to make more than one pass, partially cutting into the underlying board 133 on the first and subsequent passes until the openings 114*r*, 124*r* are fully formed. Power ratings of the router, thickness of the template, types of materials comprising the form board, and length of the router bit are all factors that determine whether or not multiple cutting passes will be necessary.

Since a series of panels 100 may be aligned along the board 133, it is not necessary to move the panel 100 down the board 133 to create longer pattern plates. Furthermore, as mentioned above, damage to the template requires only the removal and replacement of that individual panel and not the entire working fixture.

Again, the resulting, unseparated pin pattern plate 110 and tail pattern plate 112 is shown in FIG. 16. Although the pattern plates 110, 112 may be used to form dovetail joints as a unitary body, first using one side and then the other, the two pattern plates 110, 112 may also be easily separated by cutting along the center line 113, thus forming pin and tail pattern plates 10, 12 identical to those shown in FIGS. 1 and 2. These pattern plates 10, 12 can be fabricated into any desired length and are readily usable by home craftsmen to produce high quality dovetail joints. Because the pattern plates 10, 12 are easy to reproduce, the craftsman avoids the unfortunate necessity of having to purchase costly replacement pattern plates due to accidental router damage to the dovetail pin and tail pattern plates 10, 12.

Use of the Modular Panel as a Pattern Plate

Much of the foregoing discussion has been directed to using the panel 100 of the present invention as a template for fabricating pattern plates that are then used to create the pins and tails of a dovetail joint. However, the panel 100 (as best shown in FIG. 13) can also be directly used as a pattern plate. As shown in FIGS. 1–12, the panel 100 may be clamped directly to the backing member 36 and tail board 38 in the manner described above. By constructing the panel 100 from a relatively inexpensive thermoplastic, it may be replaced if damaged without undue cost. Furthermore, using the panel 100 of the present invention directly as a pattern plate eliminates the intermediate step of fabricating pattern plates using the panel 100 as a template.

Again, two separate panel pieces may be used rather than the unitary panel 100 shown in FIG. 13. These separate panel pieces may be formed by dividing the preferred panel 100 shown in FIGS. 13 and 14 along its center line 131.

Alternate Embodiment of the Panel

Figure 19A:
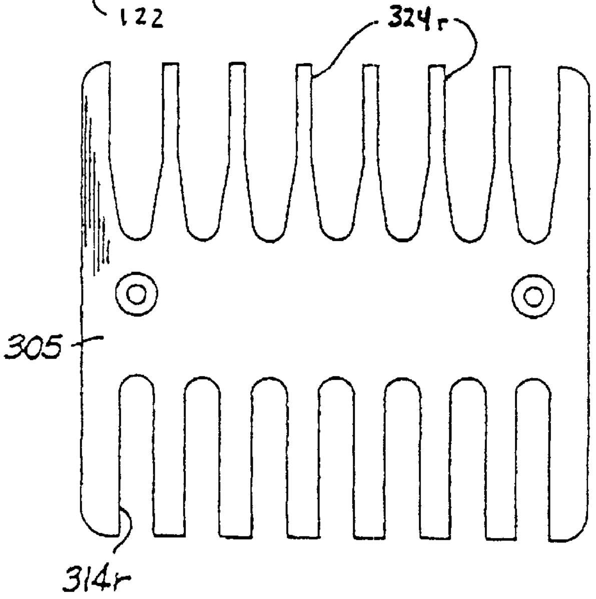
FIG. 19*a* is a top plan view of pin and tail pattern plate that may be fabricated using the template of FIG. 19.
Figure 19:
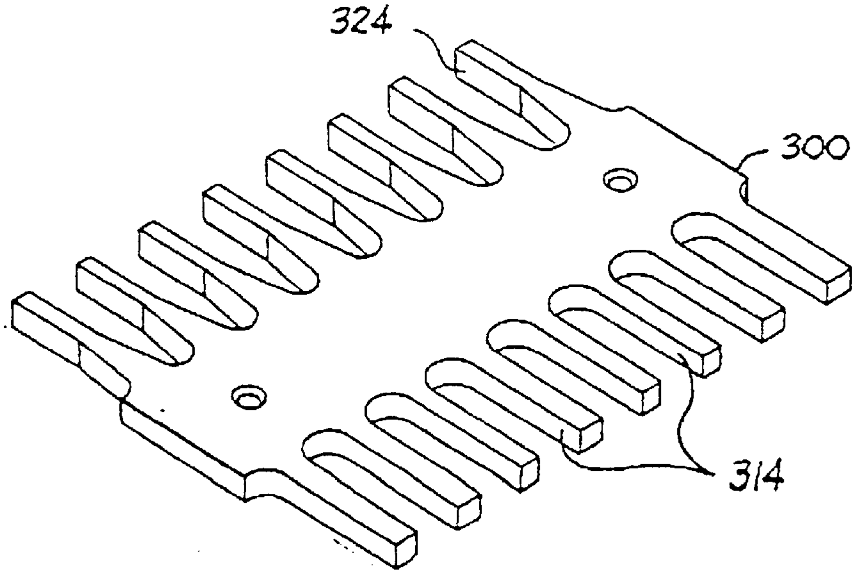
FIG. 19 is a perspective view of an alternate embodiment of the panel of the present invention that can be used either as a pattern plate or as a template to create pattern plates, said panel having pin and tail openings that are open-ended.

It is preferred and recommended that the pin and tail openings of any pattern plate be closed as opposed to having open ends. The web of material surrounding and closing the ends provides for significantly increased integrity and stability during cutting. Some craftsmen, however, may prefer that the pin and tail openings have open ends so that the router does not need to be lifted out of the openings when moving to adjacent openings. Referring again to FIG. 16, to provide for such open ends, a cut may be made intersecting the widest portions of the openings 114*r*, 124*r*, along one or both of the lines indicated by reference numerals 115 and 117 in FIG. 16. Alternatively, this may be accomplished by using a template 300, such as that shown in FIG. 19, that itself has openings 314, 324 with open ends. A pattern plate 305 made by either of these techniques in illustrated in FIG. 19*a*, wherein the first plurality of elongated openings 314*r* align one side of the pattern plate 305, and a second plurality of elongated openings 324*r* align the opposite side of the plate 305.

This alternate embodiment of the present invention may also be comprised of two separate panel pieces, the first panel piece defining the first plurality of openings 314, and the second panel piece defining the second plurality of openings 324. These separate panel pieces may be formed by dividing the panel 300 shown in FIG. 19 along its center line.

Creating Variable Spacing

Figure 17:
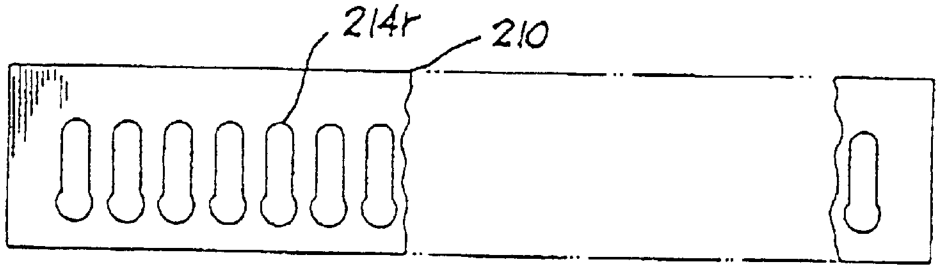
FIG. 17 is a top plan view of a separated tail pattern plate made using the panel of the present invention as a template, said pattern plate having increased spacing between its respective openings.
Figure 18:
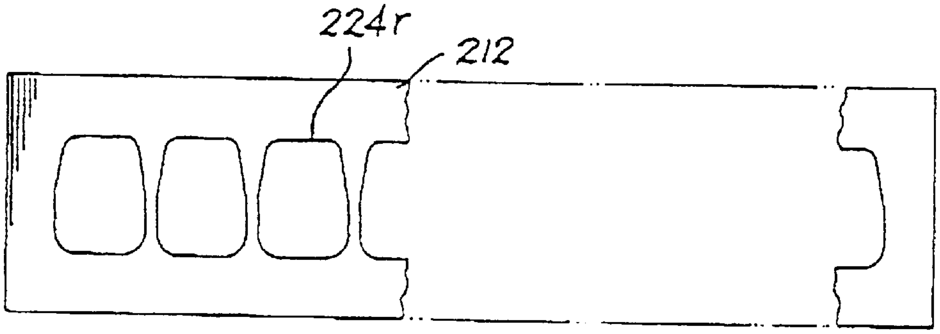
FIG. 18 is a top plan view of a separated pin pattern plate made using the panel of the present invention as a template, said pattern plate having material removed to provide for openings corresponding to the tail openings shown in FIG. 17.

One of the significant further advantages of the present invention is that the panel 100 may be used as a template to fabricate pattern plates with wider dovetail spacing or mixed spacing. Wider dovetail spacing is particularly desirable for long dovetail joints where small, close spacing may be aesthetically "too busy looking." To double the spacing, the starter holes are made through every other one of the tail openings 114 and through every one of the pin openings 124 into the form board 133, as described above. The cutting and removing of the material is identical to that described above, resulting in the tail pattern plate 210 with openings 214*r* illustrated in FIG. 17. The pin pattern plate 212 has only half as many openings 224*r* as that shown in FIG. 16. To provide for the wider spacing in the pin pattern plate 212, the material between adjacent openings is removed, resulting in the openings 224*r* shown in FIG. 18. The pattern plates 210, 212 of FIGS. 17 and 18 are ready to be used to produce dovetail joints with ½" wide pins spaced at 2" centers.

Figure 20:
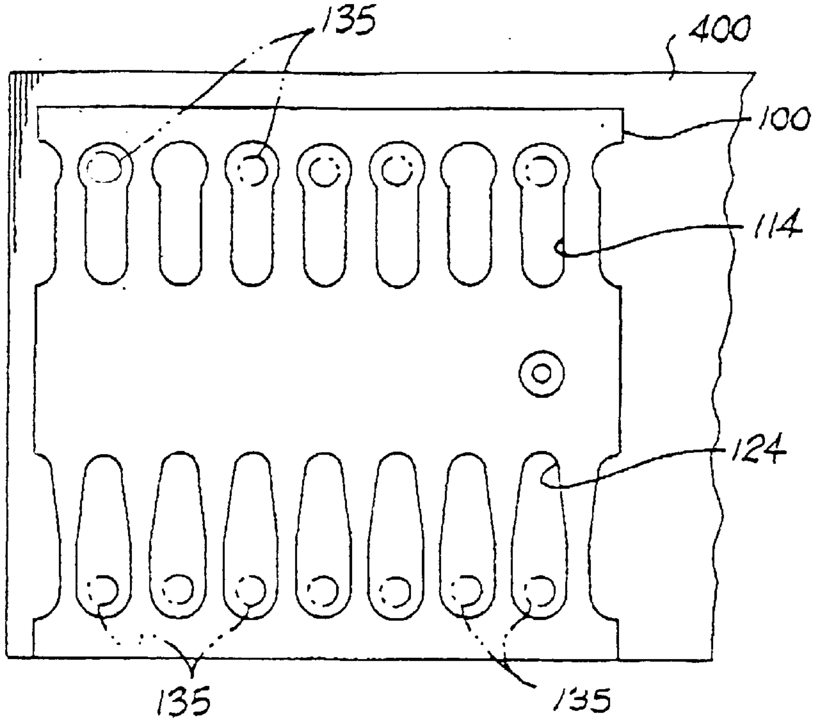
FIG. 20 is a top plan view of the panel of FIG. 13 being used as a template, said panel overlaying a form into which starter holes have been drilled into the form through selected openings of the template to fabricate a pattern plate capable of making a dovetail joint with mixed spacing.
Figure 21:
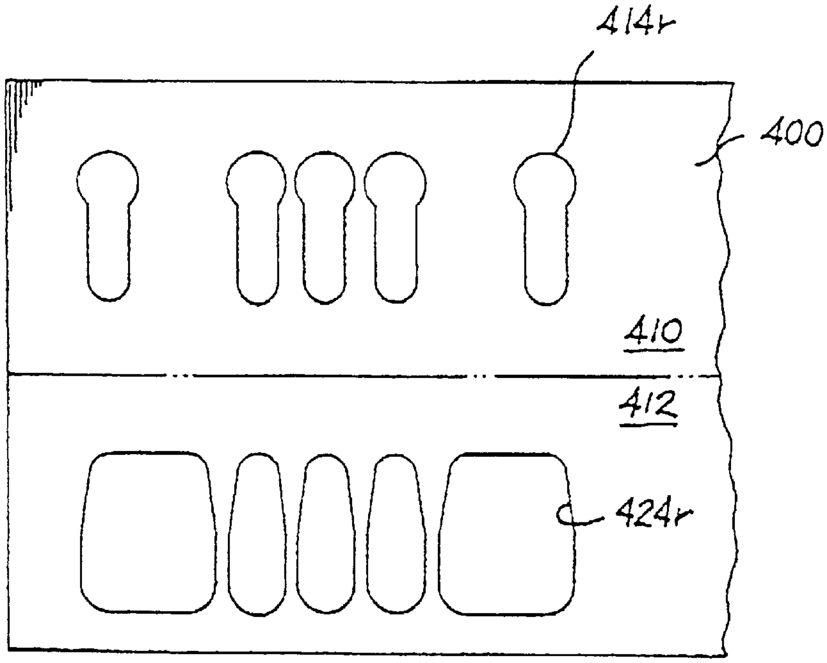
FIG. 21 is a top plan view of a unitary pin and tail pattern plate for making a dovetail joint having mixed spacing.

Finally, the panel 100 of the present invention may be used to fabricate pin and tail pattern plates capable of producing a dovetail joint in which the spacing is nonuniform. As shown in FIG. 20, by selecting certain ones of tail openings 114 through which to drill starter holes 135, and, as before, drilling starter holes through each of the pin openings 124, cutting the material away in the form board 133 using the appropriate sides of the selected openings 114, 124 to provide replicated openings 414*r*, 424*r* in the form 300, and removing the webbing material between the associated openings 424*r*, a pattern plate 400 as shown in FIG. 21 can be produced. By way of example only, the first, third, fourth, fifth, and seventh tail openings 114 were selected. as is indicated by the starter holes 135 in FIG. 20. This selection results in the replicated openings 414*r* shown in FIG. 21. The webbing cut between the associated pin openings 424*r* was located between the first and second openings on one end and the sixth and seventh openings on the opposite end. Other combinations may be selected as desired.

From the above, it can be seen that various size dovetail and pin pattern plates can be fabricated using the panel of the present invention as a template. In fabricating pattern plates using the panel as a template, inexpensive materials may be used, eliminating the problem of replacing costly pattern plates damaged by a router. Moreover, with the half-openings along either edge of the panel, a series of panels may be placed side-by-side to fabricate pattern plates of an unlimited length. Because of the modularity of these panels, if an individual panel is damaged, it may be replaced without affecting the adjacent panels. Alternatively, the panel of the present invention can also be used directly as a pattern plate for creating the pins and tails of a dovetail joint, thereby eliminating the intermediate step of fabricating the pattern plates.

It will be obvious to those skilled in the art that other modifications may also be made to the embodiments described above without departing from the spirit and scope of the present invention.

I claim:

1. A modular panel for the fabrication of dovetail joints, comprising:

- a single planar member having a pair of sides and a left edge and a right edge;
- a plurality of first elongated openings adjacent one of said sides, each of said openings extending between oppositely disposed first and second circular ends and defining a long axis, each of said first elongated openings having opposing parallel sides spaced a distance apart substantially equal to a diameter of a bearing of a preselected cutter bit, each of said first circular ends having a diameter substantially equal to said distance, and each of said second circular ends having a diameter equal to or larger than said distance;
- a plurality of second elongated openings adjacent a second one of said sides, each of said second openings having a first portion and a second portion and defining a long axis, each of said first portions having opposing sides that are substantially parallel, and each of said second portions having opposing sides that converge toward one another and away from said first portion;
- a first pair of half-openings, one of said first pair being positioned along the left edge of said planar member, and another of said first pair being positioned along the right edge of said planar member, each of said first half-openings having a geometry that results from the bisection of one of the first elongated openings along its long axis; and
- a second pair of half-openings, one of said second pair being positioned along the left edge of said planar member, and another of said second pair being positioned along the right edge of said planar member, each of said second half-openings having a geometry that results from the bisection of one of the second elongated openings along its long axis;

wherein said first and second pair of half-openings allow a plurality of modular panels to be arranged side-by-side to facilitate the fabrication of a dovetail joint of unlimited length.

2. The modular panel of claim 1, wherein the opposing sides of the second portion of each of said second openings form an angle substantially equal to the slope angle of a preselected dovetail bit.

3. The modular panel of claim 1 in which each of said first and second elongated openings is closed along the sides of said modular panel.

4. The modular panel of claim 1 in which each of said first and second elongated openings is open along the sides of said modular panel.

5. A kit for the fabrication of dovetail joints, comprising:

a first panel piece for use as a tail pattern plate or for creating a tail pattern plate from a form of cuttable material, said first panel piece comprising a first planar member having a pair of sides and a left edge and a right edge, and said first panel piece defining a plurality of first elongated openings, each of said first elongated openings extending between oppositely disposed first and second circular ends and defining a long axis, each of said first elongated openings having opposing parallel sides spaced a distance apart substantially equal to a diameter of a bearing of a preselected cutter bit, each of said first circular ends having a diameter substantially equal to said distance, and each of said second circular ends having a diameter larger than said distance; and a second panel piece for use as a pin pattern plate or for creating a pin pattern plate from a form of cuttable material, said second panel piece comprising a second planar member having a pair of sides and a left edge and a right edge, and said second panel piece defining a plurality of second elongated openings, each of said second elongated openings having a first portion and a second portion and defining a long axis, each of said first portions having opposing sides that are substantially parallel, and each of said second portions having opposing sides that converge toward one another and away from said first portion;

wherein said first panel piece also defines a first pair of half-openings, one of said first pair being positioned along the left edge of said planar member, and another of said first pair being positioned along the right edge of said planar member, each of said first half-openings having a geometry that results from the bisection of one of the first elongated openings along its long axis; and wherein said second panel piece also defines a second pair of half-openings, one of said second pair being positioned along the left edge of said second planar member, and another of said second pair being positioned along the right edge of said planar member, each of said second half-openings having a geometry that results from the bisection of one of the second elongated openings along its long axis.

6. A kit for the fabrication of dovetail joints, comprising:

a starter bit of a predetermined diameter;

a cutter bit having a cutter shape and a rotatable bearing in a shank of said bit, said cutter shape and rotatable bearing each having a diameter less than the predetermined diameter of said starter bit; and a panel for use as a pattern plate or for creating a dovetail pattern plate from a form of cuttable material, said panel comprising a single planar member having a pair of sides and a left edge and a right edge;

a plurality of first elongated openings adjacent one of said sides, each of said openings extending between oppositely disposed first and second circular ends and defining a long axis, each of said first elongated openings having opposing parallel sides spaced a distance apart substantially equal to the diameter of the bearing of said cutter bit, each of said first circular ends having a diameter substantially equal to said distance, and each of said second circular ends having a diameter larger than said distance;

a plurality of second elongated openings adjacent a second pair of sides, each of said second openings having a first portion and a second portion and defining a long axis, each of said first portions having opposing sides that are substantially parallel, and each of said second portions having opposing sides that converge toward one another and away from said first portion;

a first pair of half-openings, one of said first pair being positioned along the left edge of said planar member, and another of said first pair being positioned along the right edge of said planar member, each of said first half-openings having a geometry that results from the bisection of one of the first elongated openings; and a second pair of half-openings, one of said second pair being positioned along the left edge of said planar member, and another of said second pair being positioned along the right edge of said planar member, each of said second half-openings having a geometry that results from the bisection of one of the second elongated openings.

7. A method for forming dovetail pattern plates of indefinite length in a form using a plurality of templates, each of said templates defining a plurality of first elongated openings, a plurality of second elongated openings, and a first and second pair of half-openings; each of said first elongated openings extending between oppositely disposed first and second circular ends and defining a long axis, and each of said first elongated openings having opposing parallel sides spaced a distance apart substantially equal to a diameter of a bearing of a preselected pattern cutter bit; each of said second elongated openings having a first portion and a second portion and defining a long axis, each of said first portions having opposing sides that are substantially parallel, and each of said second portions having opposing sides that converge toward one another and away from said first portion; one of said first pair of half-openings being positioned along a left edge of said template, and another of said first pair being positioned along a right edge of said template, each of said first half-openings having a geometry that results from the bisection of one of the first elongated openings; one of said second pair of half-openings being positioned along the left edge of said template, and another of said second pair being positioned along the right edge of said template, each of said second half-openings having a geometry that results from the bisection of one of the second elongated openings; comprising the steps of:

positioning the templates over a form made from cuttable material such that the half-openings along the left edge of each template align with the corresponding half-openings along the right edge of an adjacent template;

passing a starter bit through selected openings of the first plurality of openings and through the second portions of selected openings of the second plurality of openings and drilling starter holes in the underlying form;

placing the preselected pattern cutter bit with a rotatable guide bearing of a diameter less than that of the starter holes through each of the selected openings such that the cutter bit extends into the starter holes and the rotatable bearing is rotatably engaged with the sides of the opening and guiding said bearing along the sides, thereby removing material from said cuttable form and forming a plurality of dovetail openings in said form; and removing the templates, thereby forming a unitary pin and dovetail plate from the form.

8. The method of claim 7 in which said first elongated openings have enlarged diameter first ends and said starter bit is passed through said enlarged diameter first ends of said first elongated openings to drill starter holes in the underlying form.

9. The method of claim 8 including the step of cutting the form along a line intermediate the pluralities of the pin openings and tail openings, thereby forming separate pin and dovetail plates.

10. The method of claim 8 including the step of cutting the form along at least one line opening the ends of at least one of the pluralities of pin and tail openings.

11. The method of claim 10 including the step of cutting the form along a line intermediate the pluralities of the pin openings and tail openings, thereby forming separate pin and dovetail plates.

12. The method of claim 8 including the step of initially selecting a template that corresponds to the diameter of a preselected dovetail bit in which the distance between opposing parallel sides of each of said first elongated openings is substantially equal to a diameter of a bearing of the preselected cutter bit.

* * * * *